July 5, 1966  K. NEUDECKER ETAL  3,259,410
STRUCTURE FOR OPENING AND CLOSING DEVICES
SUCH AS CAMERAS AND THE LIKE
Filed Dec. 11, 1963  2 Sheets-Sheet 1

INVENTORS
KARL NEUDECKER
FRIEDRICH WINKLER

BY Michael J. Striker

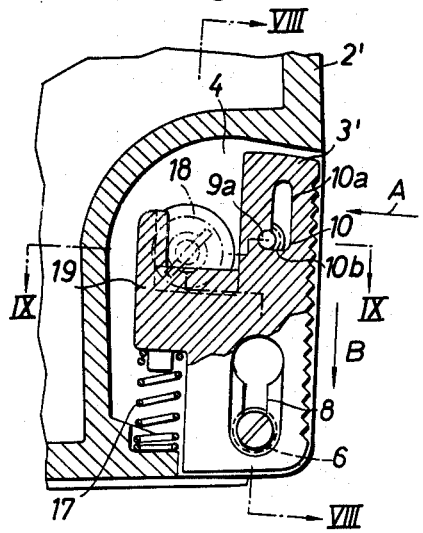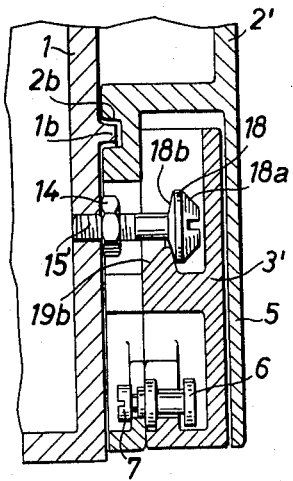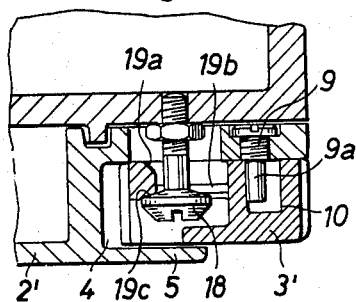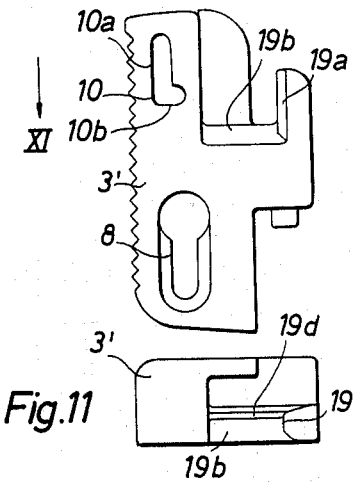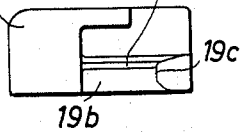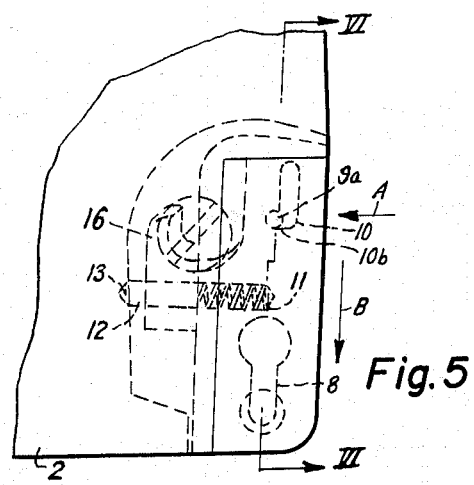
INVENTORS
KARL NEUDECKER
FRIEDRICH WINKLER
BY
Michael J. Striker

United States Patent Office 3,259,410
Patented July 5, 1966

3,259,410
STRUCTURE FOR OPENING AND CLOSING DEVICES SUCH AS CAMERAS AND THE LIKE
Karl Neudecker and Friedrich Winkler, Munich, Germany, assignors to Agfa Aktiengesellschaft, Leverkusen, Germany
Filed Dec. 11, 1963, Ser. No. 329,752
Claims priority, application Germany, Dec. 18, 1962, A 41,912
10 Claims. (Cl. 292—67)

The present invention relates to structures for opening and closing devices such as, for example, cameras and the like.

It is of course known to provide devices such as cameras and the like with covers movable between open and closed positions so that it becomes possible to have access to the interior of the housing of the device. For example, such covers may be in the form of a swingable door pivotally connected to the housing and capable of being locked in is closed position by a lock which, for example, may pass through an opening in a wall of a housing and be turned so as to directly engage the housing for locking the cover thereof in its closed position, or a turnable lock may engage other elements to provide the locking of the cover to the housing.

In order to render the locking structure accessible at the exterior of the housing, there are known structures which have the lock-actuating element projecting from the housing, but of course such a construction is highly undesirable because of the risk of inadvertent actuation of the locking structure to unlock the cover from the housing. Such unforeseen unlocking of the cover is particularly disadvantageous with motion picture cameras because the opening of the cover exposes the film in the camera housing and renders it useless. It is also known to provide on the cover a lock actuating element which is pivotally connected in such a way that when it is not in use it can be turned into a recess formed in the exterior surface of the cover, but such constructions, aside from being visually undesirable, permit anybody who has access to the camera, particularly children, to easily open the structure.

It is accordingly a primary object of the present invention to provide for a structure of the above type a construction which will reliably hold the cover in its closed position.

Thus, one of the objects of the present invention is to provide for a structure of the above type a locking arrangement which on the one hand cooperates with the housing of the device directly to maintain the cover in its closed position, so that the locking structure is simple and highly reliable in its operation, and which on the other hand does not have a disagreeable appearance and furthermore gives no hint as to how it is possible to unlock the cover so that either accidental unlocking or undesired unlocking by persons unfamiliar with the structure is also reliably avoided.

A further object of the present invention is to provide a locking structure which is incorporated into the cover assembly itself and does not project therefrom so as to provide either a conspicuous invitation to tampering or the possibility of accidental catching on outside objects to inadvertently release the cover.

Furthermore, it is an object of the present invention to provide a cover unlocking arrangement which permits the cover to be removed from and attached to the housing without requiring any pivotal connection between the housing and the cover while at the same time providing a secure connection which in the case of a camera is absolutely light-tight.

Furthermore, it is an object of the present invention to provide a locking structure of the above type which, to the person who is familiar with it, is extremely easy to operate.

It is furthermore an object of the present invention to provide a structure of the above type which requires a knowledge of just how to move the locking structure not only along one path but first along one path and then along a second path in order to actuate the locking structure, so that in this way the uninformed who have access to such a construction will not be able to unlock the cover.

Furthermore, it is an object of the present invention to provide a structure of the above type which does not require the lock to be actuated when the cover is placed on the housing but which will instead provide automatic locking of the cover to the housing when the cover is moved to its position closing the housing and which will also reliably secure the lock in its locking position so that it cannot be inadvertently unlocked in response, for example, to accidental or unintentional movement of the locking structure in a given direction.

Also, it is an object of the present invention to provide a structure capable of accomplishing all of the above objects while at the same time composed of a relatively small member of inexpensive rugged elements which operate very reliably.

With these objects in view the invention includes, in a structure for opening and closing a device such as a camera or the like, a housing means which forms part of the device which is to be opened and closed, and a cover means which has a closed position engaging and closing the housing means, this cover means having an edge portion which is formed with a cutout. A movable lock means is located in this cutout and is guided for movement between locking and unlocking positions, and a stationary lock means is carried by the housing and engages the movable lock means when the latter is in its locking position for releasably locking the cover means to the housing means.

The novel features which are considered as characteristic for the invention are set forth in particular in the appended claims. The inveniton itself, however, both as to its construction and its method of operation, together with additional objects and advantages thereof, will be best understood from the following description of specific embodiments when read in connection with the accompanying drawings, in which:

FIG. 5 is a fragmentary side elevation of the lower right hand corner of the structure where the lock assembly is located, FIG. 5 illustrating particularly various parts which move relative to each other;

FIG. 7 is a fragmentary sectional side elevation showing another embodiment of a structure according to the present invention;

FIG. 8 is a transverse sectional elevation of the structure of FIG. 7 taken along line VIII—VIII of FIG. 7 in the direction of the arrows;

FIG. 9 is a fragmentary sectional plan view of the structure of FIG. 7 taken along line IX—IX of FIG. 7 in the direction of the arrows;

FIG. 10 shows the movable lock means of the invention by itself in a side elevation; and FIG. 11 is a top plan view of the structure of FIG. 10 taken in the direction of the arrow XI of FIG. 10.

Figure 1:
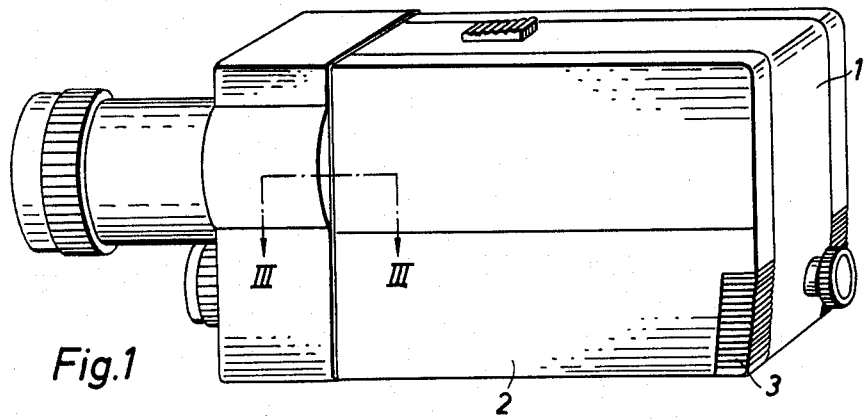
FIG. 1 is a perspective side elevation of a motion picture camera which is provided with the structure of the invention.
Figure 3:
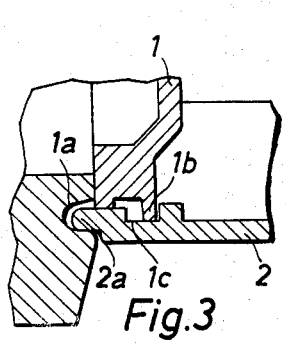
FIG. 3 is a fragmentary sectional plan view taken along line III—III of FIG. 1 in the direction of the arrows and showing how the cover means and housing means cooperate with each other to provide turning movement of the cover means relative to the housing means.

Referring to FIG. 1, there is shown therein a housing 1 of a motion picture camera, this housing carrying a cover 2 which is shown in FIG. 1 in its closed position engaging the housing 1 for closing the latter, and there is also shown at the lower right corner of FIG. 1 a movable lock means 3 capable of being actuated by the operator for unlocking the cover 2 so that it can be removed from the housing 1. The movable lock means 3 is shiftable from the position shown in FIG. 1 downwardly to the position indicated in FIG. 2 in order to unlock the cover means 2 so that it can be removed from the housing means 1. The cover means 2 is capable of being completely removed from the housing means 1, and in order to accomplish this the cover means 2 is first turned about its left edge portion, as viewed in FIG. 1, and then it can simply be moved away from the housing means 1. A rib-and-groove means provides the turning connection between the cover means 2 and the housing means 1, and this structure is shown in FIG. 3 where it will be seen that the housing means is formed distant from the lock means 3 with an elongated groove 1a which receives an elongated rib 2a which forms the left edge of the cover means 2, as viewed in FIGS. 1 and 3, so that when the lock means 3 is moved to its unlocking position shown in FIG. 2 the cover means 2 can be turned so as to turn the rib 2a in the groove 1a and then the cover means 2 can simply be displaced away from the housing 1, and of course the cover means 2 is returned to its closed position with the reverse of these operations. In order to provide light-tightness, a labyrinth tongue and groove connection is provided between the housing means 1 and the cover means 2, and thus it will be seen from FIGS. 3 and 4 that the housing means 1 is provided with a rib 1b and this rib extends all around the opening at the side of the housing means 1 which is covered by the cover means 2 when the latter is in its closed position. The rib 1b of the housing means 1 is received in a continuous endless groove 2b of the cover means 2, and this groove is made somewhat wider, as indicated at 1c in FIG. 3, along the left edge of the cover means 2. The labyrinth groove is made wider along the left edge portion of the cover 2 so that the cover can be moved freely with respect to the housing at the region of the rib-and-groove connection 2a, 1a which serves to hingedly connect the cover means 2 to the housing means 1 when the cover means is in the region of its closed position adjacent to the housing means 1.

Figures 2, 6:
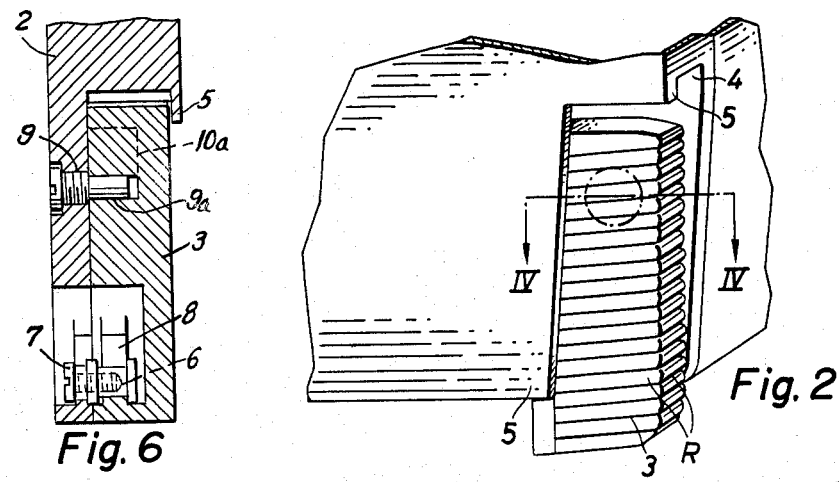
FIG. 2 is a fragmentary enlarged view of the lower right corner of FIG. 1 where the locking structure of the invention is located, this structure being shown in FIG. 2 in its unlocking position.
FIG. 6 is a transverse sectional elevation taken along line VI—VI of FIG. 5 in the direction of the arrows and showing in particular details of the structure which guides the movable lock means of the invention for movement with respect to the cover means.

As is apparent form FIG. 2, the cover means is formed at an edge portion with a cutout 4 which receives the movable lock means 3. Acutally, this cutout is situated at the illustrated corner of the cover means 2. Furthermore, the cover means 2 has at the cutout 4 an elongated wall portion 5 which extends over the movable lock means 3 so that the latter is at all times situated in part behind the wall portion 5 to be guided in part by the wall portion 5 for movement relative to the cover means 2, and it will be noted from FIG. 2 that this wall portion 5 extends not only along the left outer edge portion of the movable lock means 3 but also the wall portion 5 has an outer portion which overlies the upper end portion of the movable lock means 3 when the latter is in its locking position.

The movable lock means 3 has an exposed side surface and an exposed rear surface, and both of these surfaces are provided with flutes R or the like, so that the movable lock means 3 when engaged by the operator can be easily moved with a reliable grip provided at the surface of the movable lock means 3. Moreover, it will be noted from FIG. 1 that when the movable lock means 3 is in its closed position its exposed side and rear surfaces as well as its exposed end surface all respectively form substantial continuations of the adjoining camera surfaces so that the movable lock means 3 when in its locking position does not project in any way from the camera and on the other hand is not situated in any obvious recess at the exterior of the camera so that in this way the outline of the camera is practically unchanged by the movable lock means, when the latter is in its locking position, so as to provide a non-obvious lock which does not provide an invitation to tampering and so that in addition the movable lock means does not have any projecting parts which might accidentally catch on a foreign object to provide undesired actuation of the lock means.

A guide means is carried in part by the cover means 2 and in part by the movable lock means 3 for guiding the latter for movement relative to the cover means 2, and this guide means includes, as shown most clearly in FIG. 6, a cylindrical member 6 having a pair of end shoulders which receive between themselves the edge portion of the movable lock means 3 which defines the elongated narrow part of a keyhole slot 8. Thus, the shoulders or flanges of the guide element 6 have a diameter greater than the width of the narrow elongated part of the slot 8 so as to cooperate with the lock means 3 at this portion thereof to guide the latter for shiftable movement relative to the cover means 2. The cover means 2 itself has a slotted portion which has a rib which is received between the head of a screw 7 and the left flange of the guide element 6, as viewed in FIG. 6, this screw 7 extending into a threaded bore formed in the guide element 6 for fixing the latter to the rib of the cover means 2, in the manner shown in FIG. 6, so that the guide member 6 will remain stationary while the movable lock means 3 is shiftable relative thereto.

The guide means furthermore includes a guide member 9 threaded into a bore of the cover means 2 and having an elongated smooth pin portion 9a which is received in an elongated groove 10 formed in the movable lock means 3. The configuration of the groove 10 is clearly apparent from FIG. 5 which shows that the groove 10 has, as viewed in FIG. 5, an elongated vertical portion which together with the pin 9a forms a guide means which guides the movable lock means 3 for movement back and forth along a vertical path relative to the cover means 2, and the movable lock means 3 is shiftable from the locked position thereof shown in FIG. 5 downwardly in the direction of the arrow B along a path determined by the vertical portion of the slot 10 and pin 9a from the illustrated locking position thereof to the lower unlocking position which is also shown in FIG. 2. At its lower end, the groove 10 has a substantially horizontal portion 10b which extends substantially perpendicularly and of course transversely with respect to the portion 10a indicated in FIG. 6, and this groove portion 10b cooperates with the pin 9a to provide for the movable lock means 3 a second movement relative to the cover means 2, and this second path of movement of course extends transversely with respect to the first path of movement. The second path of movement provided by the groove portion 10b and the pin 9a makes it possible for the movable lock means 3 when it is in its locking position to move between a securing position where the lock means 3 is secured against movement from its locking to its unlocking position and a release position where it is indeed possible to move the movable lock means 3 from its locking position to its unlocking position. Thus, referring to FIG. 5, in order to shift the movable lock means 3 from the illustrated position to its unlocking position it is necessary for the operator first to move the movable lock means 3 in the direction of the arrow A so as to shift the vertical slot portion 10a into alignment with the pin 9a, and it is only after this initial movement in the direction of the arrow A that the operator can then advance the movable lock means 3 downwardly in the direction of the arrow B of FIG. 5 so as to unlock the cover means 2 from the housing means 1. It will be noted that the portion 10a of the slot 10 extends parallel to the elongated slot 8.

The structure also includes a releasable detent means which releasably holds the movable lock means 3 in its locking position, and as is shown most clearly in FIG. 5 this releasable detent means includes a spring 11 located together with a pin 12 in a bore of the movable lock means 3, and the spring 11 continuously urges the pin 12 toward the left, as viewed in FIG. 5, outwardly of the bore of the movable lock means, and a portion of the cover means 2 is formed with a recess 13 for receiving the free end of the pin 12 when the movable lock means 3 is in its locking position, so that in this way the detent means 11-13 contributes to the releasable holding of the lock means in its locking position. Furthermore, it will be noted that the spring 11 acts to urge the movable lock means in that direction which displaces the slot portion 10b to the right relative to the pin 9a so as to locate the movable lock means in its securing position where it is secured against movement away from its locking position.

Figure 4:
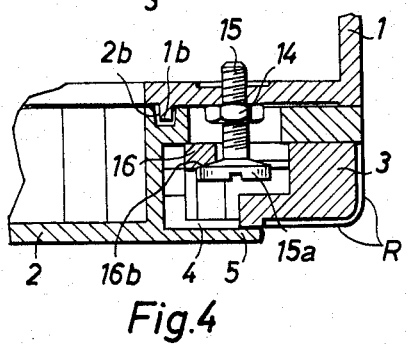
FIG. 4 is a fragmentary sectional plan view taken along line IV—IV of FIG. 2 in the direction of the arrows and showing the details of the locking and cover structure of the invention as well as of the housing which cooperates therewith.

The structure includes a stationary lock means which cooperates with the movable lock means for releasably holding the cover means locked in its closed position, and as is shown most clearly in FIG. 4, the stationary lock means is in the form of a screw member 15 threaded through a threaded bore formed in a wall portion of the housing means 1, and the screw 15 carries a lock nut 14 which fixes the screw 15 in an adjusted position. This screw 15 has a head 15a which forms a projection of the stationary lock means, and it will be noted that the underside of the head 15a has a frustoconical surface 16b which is relatively flat, which is to say this surface forms part of a cone which has a relatively large apex angle. The movable lock means 3 has a projection 16 provided with a bevelled surface of the same inclination as the surface 16b and engaging the latter so that the projection 15a of the stationary lock means extends over the projection 16 to releasably hold the cover means 2 in its closed position when the movable lock means 3 is raised to its locking position. As may be seen from FIG. 5, the projection 16 is of substantially L-shaped configuration and will move away from the head of the screw 15 when the movable lock means 3 is shifted downwardly in the direction of the arrow B of FIG. 5, whereas when the operator raises the lock means 3 back to its locking position, after the cover means 2 has been placed in engagement with the housing means 1, the projection 16 will move behind the head 15a into engagement with the surface 16b thereof to provide the locking engagement between the stationary and movable lock means, and of course once the operator has raised the movable lock means 3 to its locking position the pin 12 will enter into the recess 3 to releasably retain the movable lock means in its locking position. In order to unlock the structure it is only necessary for the operator first to move the movable lock means in the direction of the arrow A of FIG. 5, and then to move the lock means 3 downwardly in the direction of the arrow B, while initially overcoming the force of the spring 11 so as to displace the pin 12 out of the recess 13, and then the movable lock means 3 can be moved to the position shown in FIG. 2 where the projection 16 has moved away from the head 15a of the screw 15 by a distance sufficient to clear the latter so that the cover means 2 can be turned about its edge portion 2a away from the housing means 1, and of course, as is apparent particularly from FIG. 4, the movable lock means 3 as well as the cover means 2 are provided with free spaces enabling the parts 2 and 3 to move freely past the stationary lock means 15 during movement of the cover means 2 away from and back toward the housing 1. The cover means 2 is returned to its closed position and locked therein by the reverse of the above-described operations.

When the cover is returned to its closing position and the movable lock means 3 is raised back to its locking position, this lock means will be retained in its locking position not only by the detent means 11-13, but also by the location of the left end of the slot portion 10b in engagement with the pin 9a, where the movable lock means is secured against being moved away from its locking position, as pointed out above.

Another embodiment of the invention is illustrated in FIGS. 7-11 where the reference characters are the same as those of FIGS. 1-6 when indicating elements of the same construction.

Referring now to FIGS. 7-11, it will be seen that the movable lock means 3' is again situated in a cutout 4 formed in the lower right corner of the cover means 2', and FIG. 9 shows the wall portion 5 which overlies the movable lock means 3' in the manner described above. It will be noted that FIG. 8 also shows part of the wall portion 5 which overlies the movable lock means 3'. Furthermore, this structure also includes the above-described guiding assembly 6-8 which guides the movable lock means 3' for movement in the direction of the arrow B as well as, when the bottom end of the slot 8 has reached the guide element 6, for turning movement so that the left end of the slot 10b can be placed in engagement with the pin 9a, as clearly shown in FIG. 7.

In this embodiment, however, there is a spring means which urges the movable lock means 3' to its locking position and also to its securing position in which it is shown in FIG. 7, and in accordance with the present invention this spring means takes the form of a single spring 17 in the form of an elongated coil spring which is compressed between portions of the cover means 2' and the movable lock means 3', as shown most clearly in FIG. 7. It will be noted that the spring means 17 extends in a direction generally parallel to the slot portion 10a and the slot 8, while located to one side of these slots so that the spring means 17 tends to turn the movable lock means 3' in a clockwise direction, as viewed in FIG. 7, and in fact it will turn the movable lock means 3' in this manner as soon as the bottom end of the slot 8 and the bottom end of the slot portion 10a respectively reach the elements 6 and 9a so that the horizontal slot portion 10b will in this way be displaced to the right, as viewed in FIG. 7, placing the movable lock means 3' in its secured position where it is secured against displacement to its unlocking position.

With the embodiment of FIGS. 7-11, the stationary lock means formed by the screw 15' has a projection or head 18 which has a pair of frustoconical or bevelled surfaces 18a and 18b, and as is apparent from FIGS. 8 and 9, the front surface portion 18a is inclined at a sharper angle than the underside 18b of the head 18. The substantially L-shaped projection of the movable lock means 3' has bevelled surface portions 19a and 19b shown most clearly in FIG. 10, and FIG. 11 shows the edge 19d which moves past the outer periphery of the head 18 of the screw 15' to provide the locking and unlocking cooperation between the stationary and movable lock means. At the side of the edge 19d opposite from the bevelled surface portions 19a and 19b, the movable lock means 3' has a second bevelled surface portion 19c which cooperates with the underside 18b of the projection 18 of the stationary lock means to hold the movable lock means 3' in its locking position retaining the cover means 2' on the housing. It will be noted that the elongated surface portion 19b of the projection 19 extends generally parallel to the slot portion 10b while the elongated surface portion 19a extends generally parallel to the slot portion 10a.

In order to unlock the cover means 2′, the operator will actuate the movable lock means 3′ in the manner described above by first pressing inwardly in the direction of the arrow A (FIG. 7) and then advancing the movable lock means 3′ downwardly in the direction of the arrow B, so as to displace the projection 19 away from the head 18 by a distance sufficient to permit the movable lock means to move past the stationary lock means and thus release the cover means 2′ for removal from the housing. However, it will be noted that with this embodiment when the operator releases the movable lock means 3′, even when the cover means 2′ is not attached to the housing, the spring 17 will immediately return the movable lock means 3′ to the position illustrated in FIG. 7, so that the movable lock means 3′ is in fact in this position when the cover means 2′ is moved to its closed position engaging and closing the housing means. However, with this embodiment all that is required is for the operator to return the cover means to its closed position and the movable lock means will automatically resume its locking engagement with respect to the stationary lock means and in addition it will be automatically secured against movement away from its locking position. As the cover means 2′ approaches close to its closed position, the surface 18a of the stationary lock means will cooperate with the bevelled surfaces 19a and 19b to provide automatic movement of the movable lock means 3′. Initially, it will not be possible for the movable lock means 3′ to move in the direction of the arrow B because of the location of the left end of the slot 10b in engagement with the pin 9a as shown in FIG. 7, so that initially the pressure between the surface 19a and the surface 18a as the cover means approaches closely to its closed position will displace the movable lock means 3′ in a counterclockwise direction, as viewed in FIG. 7, in opposition to the spring 17, thus automatically aligning the elongated slot portion 10a with the pin 9a, and then the continued movement of the cover means toward its closed position will cause the bevelled surface 19b to slip downwardly with respect to the lower portion of the surface 18a against which it is pressed so as now to displace the movable lock means 3′ in opposition to the spring 17′ in the direction of the arrow B, and this action takes place until the projection 19 moves past the outer edge of the head 18 snapping behind the latter and thus automatically placing, under the action of the spring 17, the inner bevelled surface 19b of the projection 19 in engagement with the bevelled or frustoconical surface 18b of the stationary lock means 15′. It will be noted that due to the relative flatness of the surfaces 18b and 19c the operator cannot displace the lock means 3′ away from its locking position simply by pulling the cover means 2′ away from the housing 1, and of course this movement in any event is prevented by the location of the lock means 3′ in its securing position shown in FIG. 7. However, the sharper inclination of the surfaces 18a of the stationary lock means and 19a and 19b of the movable lock means makes it easy to displace the movable lock means 3′ relative to the stationary lock means only during movement of the cover means 2′ toward its closed position. It will be noted that the elongated bevelled surface 19a is displaced toward the camera housing so as to first engage the surface 18a in the manner described above. Of course, once the projection 19 moves at its edge 19d past the outer periphery of the head 18 during return of the cover means 2′ to its closed position, the spring 17 will automatically return the movable lock means 3′ to the position illustrated in FIG. 7.

The above-described detailed structure of the invention can of course be changed in many ways. For example, it is possible to provide a pair of guides for longitudinal and turning movement of the movable lock means instead of a common slot 10a, 10b cooperating with a single pin 9a. Also, the construction can be reversed so that the screw 15 or 15′ is carried by the movable lock means and cooperates with a projection which forms part of the housing and has either the construction of the projection 16 of FIGS. 1–6, or of the projection 19 of FIGS. 7–11. Moreover, instead of frustoconical screw heads, it is possible to use also other types of locking surfaces which provide direct locking engagement between the housing and the movable lock means. Also, it is possible to use a plurality of pairs of cooperating locking elements. Furthermore, it is possible to provide with the embodiment of FIGS. 7–11 a releasable detent structure similar to that used in the embodiment of FIGS. 1–6, for example.

It will be understood that each of the elements described above, or two or more together, may also find a useful application in other types of closing and opening structures differing from the types described above.

While the invention has been illustrated and described as embodied in closing and opening devices for cameras or the like, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a structure for closing and opening devices such as cameras, in combination, housing means forming part of a device which is to be opened and closed; cover means having a closed position engaging and closing said housing means, said cover means having a corner and being formed at said corner with a cutout; movable lock means located in said cutout; guide means carried in part by said cover means and in part by said movable lock means for guiding the latter for movement relative to said cover means in one pair of opposite directions along a first path between locking and unlocking positions for respectively locking and unlocking said cover means and in a second pair of opposite directions along a second path extending from an end of said first path for securing said movable lock means against movement along said first path and for releasing said lock means for movement along said first path, said movable lock means being movable along said second path only when said movable lock means is in a locking position locking said cover means to said housing means; and stationary lock means carried by said housing means and engaged by said movable lock means when the latter is in said locking position thereof for releasably locking said cover means to said housing means in the closed position of said cover means, the exposed surfaces of said movable lock means forming in said locking position thereof substantial continuations of adjoining surfaces of said housing and cover means without projecting from said adjoining surfaces while continuing the outline of the configuration of said housing and cover means so that said cutout is concealed and the presence of said movable lock means and its purpose are not obvious and so that accidental catching of said movable lock means on a foreign object is avoided, while in said unlocking position thereof at least a portion of said movable lock means projects beyond the outline of said housing and cover means to thus expose at least a portion of said cutout.

2. In a structure for opening and closing a device such as a camera, in combination, housing means forming part of the device which is to be opened and closed; cover means having a closed position engaging and closing said housing means, said cover means having a corner and being formed at said corner with a cutout; movable lock means located in said cutout; pin-and-slot means carried in part by said cover means and in part by said movable lock means for guiding the latter for movement relative to said cover means, said pin-and-slot means providing a first elongated path along which said movable lock means is movable between locking and unlocking positions and a second path extending transversely with respect to said first path for guiding said movable lock means for movement relative to said cover means when said movable lock means is in said locking position thereof between a securing position preventing said movable lock means for moving along said first path and a release position releasing said movable lock means for movement along said first path; and stationary lock means carried by said housing means and engaged by said movable lock means when the latter is in said locking position thereof for releasably locking said cover means to said housing means, the exposed surfaces of said movable lock means forming in said locking position thereof substantial continuations of adjoining surfaces of said housing and cover means without projecting from said adjoining surfaces while continuing the outline of the configuration of said housing and cover means so that said cutout is concealed and the presence of said movable lock means and its purpose are not obvious and so that accidental catching of said movable lock means on a foreign object is avoided, while in said unlocking position thereof at least a portion of said movable lock means projects beyond the outline of said housing and cover means to thus expose at least a portion of said cutout.

3. In a structure for closing and opening devices such as cameras, in combination, housing means forming part of a device which is to be opened and closed; cover means having a closed position engaging and closing said housing means, said cover means having a corner and being formed at said corner with a cutout; movable lock means located in said cutout; guide means carried in part by said cover means and in part by said movable lock means for guiding the latter for movement relative to said cover means in one pair of opposite directions along a first path between locking and unlocking positions for respectively locking and unlocking said cover means and in a second pair of opposite directions along a second path extending from an end of said first path for securing said movable lock means against movement along said first path and for releasing said lock means for movement along said first path, said movable lock means being movable along said second path only when said movable lock means is in a locking position locking said cover means to said housing means; stationary lock means carried by said housing means and engaged by said movable lock means when the latter is in said locking position thereof for releasably locking said cover means to said housing means in the closed position of said cover means, the exposed surfaces of said movable lock means forming in said locking position thereof substantial continuations of adjoining surfaces of said housing and cover means without projecting from said adjoining surfaces while continuing the outline of the configuration of said housing and cover means so that said cutout is concealed and the presence of said movable lock means and its purpose are not obvious and so that accidental catching of said movable lock means on a foreign object is avoided, while in said unlocking position thereof at least a portion of said movable lock means projects beyond the outline of said housing and cover means to thus expose at least a portion of said cutout; and releasable detent means carried in part by said cover means and in part by said movable lock means for releasably holding the latter in said securing position where said movable lock means is secured against movement away from its position locking said cover means to said housing means.

4. In a structure for closing and opening devices such as cameras, in combination, housing means forming part of a device which is to be opened and closed; cover means having a closed position engaging and closing said housing means, said cover means having a corner and being formed at said corner with a cutout; movable lock means located in said cutout; guide means carried in part by said cover means and in part by said movable lock means for guiding the latter for movement relative to said cover means in one pair of opposite directions along a first path between locking and unlocking positions for respectively locking and unlocking said cover means and in a second pair of opposite directions along a second path extending from an end of said first path for securing said movable lock means against movement along said first path and for releasing said lock means for movement along said first path, said movable lock means being movable along said second path only when said movable lock means is in a locking position locking said cover means to said housing means; stationary lock means carried by said housing means and engaged by said movable lock means when the latter is in said locking position thereof for releasably locking said cover means to said housing means in the closed position of said cover means, the exposed surfaces of said movable lock means forming in said locking position thereof substantial continuations of adjoining surfaces of said housing and cover means without projecting from said adjoining surfaces while continuing the outline of the configuration of said housing and cover means so that said cutout is concealed and the presence of said movable lock means and its purpose are not obvious and so that accidental catching of said movable lock means on a foreign object is avoided, while in said unlocking position thereof at least a portion of said movable lock means projects beyond the outline of said housing and cover means to thus expose at least a portion of said cutout; and releasable detent means carried in part by said cover means and in part by said movable lock means for releasably holding the latter in said securing position where said movable lock means is secured against movement away from its position locking said cover means to said housing means, said detent means including a spring-pressed pin carried by said movable lock means and a portion of said cover means formed with a recess which receives an end of said pin when said movable lock means is in said locking position thereof.

5. In a structure for opening and closing a device such as a camera, in combination, housing means forming part of the device which is to be opened and closed; cover means having a closed position engaging said housing means and closing the latter, said cover means having a corner and being formed at said corner with a cutout; movable lock means located in said cutout for movement relative to said cover means; guide means carried in part by said cover means and in part by said movable lock means for guiding the latter for movement relative to said cover means along a first path between locking and unlocking positions and when said movable lock means is in said locking position along a second path extending transversely with respect to said first path between a securing position where said movable lock means is secured against movement along said first path and a release position where said movable lock means is released for movement along said first path; spring means operatively connected to said cover means and movable lock means for urging the latter to move first along said first path to said locking position and then along said second path to said securing position; and stationary lock means carried by said housing and engaged by said movable lock means when the latter is in said locking position thereof for releasably locking said cover means to said housing in said closed position of said cover means, the exposed surfaces of said movable lock means forming in said locking position thereof substantial continuations of adjoining surfaces of said housing and cover means without projecting from said adjoining surfaces while continuing the outline of said configuration of said housing and cover means so that said cutout is concealed and the presence of said movable lock means and its purpose are not obvious and so that accidental catching of said movable lock means on a foreign object is avoided, while in said unlocking position thereof at least a portion of said movable lock means projects beyond the outline of said housing and cover means to thus expose at least a portion of said cutout.

6. In a structure for opening and closing a device such as a camera, in combination, housing means forming part of the device which is to be opened and closed; cover means having a closed position engaging said housing means and closing the latter, said cover means having a corner and being formed at said corner with a cutout; movable lock means located in said cutout for movement relative to said cover means; guide means carried in part by said cover means and in part by said movable lock means for guiding the latter for movement relative to said cover means along a first path between locking and unlocking positions and when said movable lock means is in said locking position along a second path extending transversely with respect to said first path between a securing position where said movable lock means is secured against movement along said first path and a release position where said movable lock means is released for movement along said first path; spring means operatively connected to said cover means and movable lock means for urging the latter to move first along said first path to said locking position and then along said second path to said securing position; and stationary lock means carried by said housing and engaged by said movable lock means when the latter is in said locking position thereof for releasably locking said cover means to said housing in said closed position of said cover means, said spring means being in the form of a single compression spring arranged between portions of said cover means and movable lock means and extending in a direction which is generally parallel to said first path, the exposed surfaces of said movable lock means forming in said locking position thereof substantial continuations of adjoining surfaces of said housing and cover means without projecting from said adjoining surfaces while continuing the outline of the configuration of said housing and cover means so that said cutout is concealed and the presence of said movable lock means and its purpose are not obvious and so that accidental catching of said movable lock means on a foreign object is avoided, while in said unlocking position thereof at least a portion of said movable lock means projects beyond the outline of said housing and cover means to thus expose at least a portion of said cutout.

7. In a structure for opening and closing a device such as a camera, in combination, housing means forming part of the device which is to be opened and closed; cover means having a closed position engaging said housing means and closing the latter, said cover means having a corner and being formed at said corner with a cutout; movable lock means located in said cutout; guide means carried in part by said cover means and in part by said movable lock means for guiding the latter for movement back and forth along a predetermined path relative to said cover means between locking and unlocking positions, said movable lock means having an elongated bevelled surface portion extending in the direction transverse to said elongated path of movement of said movable lock means between said locking and unlocking positions thereof, the exposed surfaces of said movable lock means forming in said locking position thereof substantial continuations of adjoining surfaces of said housing and cover means without projecting from said adjoining surfaces while continuing the outline of the configuration of said housing and cover means so that said cutout is concealed and the presence of said movable lock means and its purpose are not obvious and so that accidental catching of said movable lock means on a foreign object is avoided, while in said unlocking position thereof at least a portion of said movable lock means projects beyond the outline of said housing and cover means to thus expose at least a portion of said cutout; spring means operatively connected to said movable lock means for urging the latter along said path to said locking position thereof; and stationary lock means carried by said housing means and cooperating with said movable lock means for releasably locking said cover means to said housing means when said movable lock means is in said locking position thereof, said stationary lock means having a projection provided with a surface which is inclined in substantially the same direction as said bevelled surface and which engages the latter when said cover means is moved toward said housing means for displacing said movable lock means in opposition to said spring means away from said locking position, said movable lock means snapping behind said projection when said cover is in its closed position for automatically placing said movable lock means in a position engaging said stationary lock means to lock said cover means in said closed position thereof.

8. In a structure for opening and closing a device such as a camera, in combination, housing means forming part of the device which is to be opened and closed; cover means having a closed position engaging said housing means and closing the latter, said cover means having an edge portion formed with a cutout; movable lock means located in said cutout; guide means carried in part by said cover means and in part by said movable lock means for guiding the latter for movement back and forth along a predetermined path relative to said cover means between locking and unlocking positions, said movable lock means having an elongated bevelled surface portion extending in the direction transverse to said elongated path of movement of said movable lock means between said locking and unlocking positions thereof; spring means operatively connected to said movable lock means for urging the latter along said path to said locking position thereof; and stationary lock means carried by said housing means and cooperating with said movable lock means for releasably locking said cover means to said housing means when said movable lock means is in said locking position thereof, and stationary lock means having a projection provided with a surface which is inclined in substantially the same direction as said bevelled surface and which engages the latter when said cover means is moved toward said housing means for displacing said movable lock means in opposition to said spring means away from said locking position, said movable lock means snapping behind said projection when said cover is in its closed position for automatically placing said movable lock means in a position engaging said stationary lock means to lock said cover means in said closed position thereof, said guide means also guiding said movable lock means when it is in said locking position thereof for movement along a second path which extends transversely with respect to said first path to a securing position where said movable lock means is secured against movement along said first path.

9. In a structure for opening and closing a device such as a camera, in combination, housing means forming part of the device which is to be opened and closed; cover means having a closed position engaging said housing means and closing the latter, said cover means having an edge portion formed with a cutout; movable lock means located in said cutout; guide means carried in part by said cover means and in part by said movable lock means for guiding the latter for movement back and forth along a predetermined path relative to said cover means between locking and unlocking positions, said movable lock means having an elongated bevelled surface portion extending in the direction transverse to said elongated path of movement of said movable lock means between said locking and unlocking positions thereof; spring means operatively connected to said movable lock means for urging the latter along said path to said locking position thereof; and stationary lock means carried by said housing means and cooperating with said movable lock means for releasably locking said cover means to said housing means when said movable lock means is in said locking position thereof, and stationary lock means having a projection provided with a surface which is inclined in substantially the same direction as said bevelled surface and which engages the latter when said cover means is moved toward said housing means for displacing said movable lock means in opposition to said spring means away from said locking position, said movable lock means snapping behind said projection when said cover is in its closed position for automatically placing said movable lock means in a position engaging said stationary lock means to lock said cover means in said closed position thereof, said guide means also guiding said movable lock means when it is in said locking position thereof for movement along a second path which extends transversely with respect to said first path to a securing position where said movable lock means is secured against movement along said first path, said spring means urging said movable lock means to move along said second path when said movable lock means has reached said locking position thereof.

10. In a structure for opening and closing a device such as a camera, in combination, housing means forming part of the device which is to be opened and closed; cover means having a closed position engaging said housing means and closing the latter, said cover means having an edge portion formed with a cutout; movable lock means located in said cutout; guide means carried in part by said cover means and in part by said movable lock means for guiding the latter for movement back and forth along a first path between locking and unlocking positions and for movement back and forth along a second path which extends transversely of said first path for movement between securing and release positions, said movable lock means in said securing position thereof being incapable of moving along said first path away from said locking position, and said movable lock means carrying a projection having an edge portion part of which has a bevelled surface extending in the same general direction as said second path and part of which has a bevelled surface extending in the same general direction as said first path; spring means urging said movable lock means along said first path to said locking position thereof and along said second path to said securing position thereof; and stationary lock means carried by said housing and engaging said movable lock means at said projection thereof for locking said cover means in said closed position thereof, said stationary lock means having a projection provided with a bevelled surface which engages first said surface of said movable lock means which extends generally parallel to said first path, while said cover means is moved to its closed position, for displacing said movable lock means relative to said cover means in opposition to said spring means away from said securing position to said release position, and then engaging said surface portion of said movable lock means which extends generally parallel to said second path for displacing said movable lock means in opposition to said spring means along said first path away from said locking position until said cover means reaches said closed position thereof, whereupon said movable lock means snaps behind said projection of said stationary lock means and said spring means advances said movable lock means along said first and second paths first to said locking position and then to said securing position.

References Cited by the Examiner

UNITED STATES PATENTS

| | | | |
|---|---|---|---|
| 214,933 | 4/1879 | Maier | 292—128 |
| 1,252,027 | 1/1918 | Ralls | 292—65 |
| 1,655,525 | 1/1928 | Underwood. | |
| 1,784,551 | 12/1930 | Smith. | |
| 1,823,299 | 9/1931 | Stuber. | |
| 2,027,004 | 1/1936 | Stewart. | |
| 2,472,486 | 6/1949 | Levinson. | |
| 2,878,389 | 3/1959 | Raffmann | 292—175 |
| 2,903,952 | 9/1959 | Naumann | 292—74 |

FOREIGN PATENTS 433,568   8/1935   Great Britain.

PATRICK A. CLIFFORD, *Primary Examiner.*

M. HENSON WOOD, JR., *Examiner.*

J. R. MOSES, *Assistant Examiner.*